United States Patent
Chu et al.

(10) Patent No.: US 7,715,140 B2
(45) Date of Patent: May 11, 2010

(54) METHOD OF DETERMINING SIZE OF ERROR AND WRITE CONTROL METHOD FOR HARD DISC DRIVE, HARD DISC DRIVE USING THE WRITE CONTROL METHOD, AND MEDIA STORING COMPUTER PROGRAMS FOR EXECUTING THE METHODS

(75) Inventors: Sang-hoon Chu, Youngin-si (KR); Cheol-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 595 days.

(21) Appl. No.: 11/442,239

(22) Filed: May 30, 2006

(65) Prior Publication Data

US 2007/0014043 A1 Jan. 18, 2007

(30) Foreign Application Priority Data

Jul. 12, 2005 (KR) .................. 10-2005-0062906

(51) Int. Cl.
G11B 5/09 (2006.01)
(52) U.S. Cl. .................. 360/53; 360/31; 360/48; 360/59
(58) Field of Classification Search .............. 360/31, 360/48, 53, 77.02
See application file for complete search history.

(56) References Cited

U.S. PATENT DOCUMENTS

| 5,212,677 | A | * | 5/1993 | Shimote et al. | 369/53.17 |
|---|---|---|---|---|---|
| 5,442,499 | A | * | 8/1995 | Emori | 360/77.08 |
| 5,568,627 | A | * | 10/1996 | Leshay et al. | 711/112 |
| 5,812,338 | A | * | 9/1998 | Ogasawara et al. | 360/77.08 |
| 5,852,522 | A | * | 12/1998 | Lee | 360/48 |
| 5,903,410 | A | * | 5/1999 | Blaum et al. | 360/77.08 |
| 5,917,439 | A | * | 6/1999 | Cowen | 341/96 |
| 5,920,440 | A | * | 7/1999 | Bang | 360/51 |
| 6,034,829 | A | * | 3/2000 | Suzuki et al. | 360/25 |
| 6,075,667 | A | * | 6/2000 | Kisaka et al. | 360/49 |
| 6,088,176 | A | * | 7/2000 | Smith et al. | 360/46 |
| 6,278,568 | B1 | * | 8/2001 | Cloke et al. | 360/51 |
| 6,304,398 | B1 | * | 10/2001 | Gaub et al. | 360/49 |
| 6,332,207 | B1 | * | 12/2001 | Southerland et al. | 714/763 |
| 6,335,840 | B1 | * | 1/2002 | Malone | 360/25 |

(Continued)

FOREIGN PATENT DOCUMENTS

JP 10-340401 12/1998

(Continued)

*Primary Examiner*—Dismery E Mercedes
(74) *Attorney, Agent, or Firm*—Staas & Halsey LLP

(57) ABSTRACT

A method of determining a size of an error generated in a servo sector, a write control method of controlling whether to write data to data sectors successive to a servo sector according to the size of the error generated in the servo sector therein, a HDD using the write control method, and a recording media storing computer programs for executing the methods. A method of determining a size of an error generated in a servo sector of a HDD includes: reading servo information from the servo sector in which the error was generated; and determining the size of the error by the number of corresponding bits that differ from each other between the read servo information and a normal servo information.

12 Claims, 5 Drawing Sheets

U.S. PATENT DOCUMENTS

| | | | |
|---|---|---|---|
| 6,335,845 B1 * | 1/2002 | Yamaguchi et al. | 360/75 |
| 6,392,831 B1 * | 5/2002 | Yeo et al. | 360/53 |
| 6,414,809 B1 * | 7/2002 | Sakai et al. | 360/60 |
| 6,504,662 B2 * | 1/2003 | Sobey | 360/25 |
| 6,628,465 B2 * | 9/2003 | Yong | 360/31 |
| 6,925,580 B2 * | 8/2005 | Hoskins | 714/8 |
| 7,050,249 B1 * | 5/2006 | Chue et al. | 360/49 |
| 7,075,742 B2 * | 7/2006 | Ehrlich | 360/29 |
| 7,206,150 B2 * | 4/2007 | Koshkina et al. | 360/53 |
| 7,245,447 B2 * | 7/2007 | Zaitsu | 360/60 |
| 7,369,343 B1 * | 5/2008 | Yeo et al. | 360/60 |
| 7,508,612 B2 * | 3/2009 | Biskeborn et al. | 360/55 |
| 2002/0191319 A1 * | 12/2002 | Liew et al. | 360/53 |
| 2003/0030929 A1 * | 2/2003 | Ozdemir | 360/46 |
| 2003/0039047 A1 * | 2/2003 | Ottesen et al. | 360/48 |
| 2003/0197971 A1 * | 10/2003 | Lyle et al. | 360/78.04 |
| 2003/0237024 A1 * | 12/2003 | Ogawa et al. | 714/29 |

FOREIGN PATENT DOCUMENTS

| | | |
|---|---|---|
| KR | 1999-0080107 | 11/1999 |
| KR | 10-0403044 | 10/2003 |

* cited by examiner

METHOD OF DETERMINING SIZE OF ERROR AND WRITE CONTROL METHOD FOR HARD DISC DRIVE, HARD DISC DRIVE USING THE WRITE CONTROL METHOD, AND MEDIA STORING COMPUTER PROGRAMS FOR EXECUTING THE METHODS

CROSS-REFERENCE TO RELATED APPLICATION

This application claims the benefit of Korean Patent Application No. 10-2005-0062906, filed on Jul. 12, 2005, in the Korean Intellectual Property Office, the disclosure of which is incorporated herein by reference.

BACKGROUND OF THE INVENTION

1. Field of the Invention

The present invention relates to a write control method for a hard disc drive (HDD), and more particularly, to a method of determining a size of an error generated in a servo sector, a write control method of controlling whether to write data to data sectors successive to the servo sector according to the size of the error generated in the servo sector, a HDD using the method of determining the error size and the write control method, and a recording media for storing computer programs for executing the methods.

2. Description of the Related Art

A hard disc drive (HDD) includes a plurality of magnetic heads respectively associated with rotating discs. Each head writes information by magnetizing a disc surface or reads information by detecting a magnetic field from the disc surface.

Each head is typically assembled with a flexure beam to form an assembly called a head gimbal assembly (HGA). The HGA is assembled with an actuator arm having a voice coil assembled with a magnet assembly. The voice coil and the magnet assembly form a voice coil motor (VCM) that moves the head across the disc by activating the actuator arm.

Information is typically stored on tracks concentrically formed on the disc. The VCM moves the head from a certain track to another track in order to access data stored on the disc surface. Each track contains a plurality of sectors, each sector having at least a servo sector and a data sector.

A servo device of the HDD controls the VCM so that the head follows a desired track. The servo device controls the VCM by calculating a track address and a necessary amount of an offset.

Servo information including a gray code, servo burst signals, etc., is written on the disc by a servo writer and a self-servo writing process when manufacturing the HDD.

As a storage capacity of HDDs has increased, not only a track pitch has become narrower, but also a flying height of the head has become lower. Due to the decrease of the flying height of the head, a margin between the head and the disk has become smaller and thereby a possibility of a scratch to occur on the disc has increased. In the meantime, if polishing of surfaces of the disc is bad or contaminated particles, which are introduced from the outside or produced during operations of the HDD, are placed on the disc, a possibility of a Thermal Asperity (TA), which is caused by contact of the head with protruded particles or contaminated particles, becomes higher.

When the scratch and the TA are generated in the area in which the gray code of the servo information is written, an exact track address cannot be obtained. If a target track and a target sector cannot be followed exactly in a write operation of the HDD, the HDD prohibits data from being written to prevent erasure of adjacent tracks in the first step, performs a write retry, which is a operation to search the target track again or to correct an error while the disc is rotating. Not until the target track and the target sector were searched or the error was corrected, the HDD writes data. If the target track and the target sector are not possible to follow or the error cannot be corrected, the HDD arranges the target track and the target sector to be processed as defected ones, write data on a spare data sector.

FIG. 1 shows servo sectors written on the disc. In a sectored servo manner, servo sectors 102 are disposed on the disc in a radial manner and data sectors 104 disposed between successive servo sectors in a track direction.

FIG. 2 shows a format of servo information written in the servo sector 102. According to the sectored servo manner, generally, servo information includes a servo synchronization signal (SYNC or preamble), a servo index mark (SIM)/a servo address mark (SAM), a gray code, bursts etc.

Among them, the servo synchronization signal has constant amplitude and a constant frequency and serves for providing a clock signal and a gain to be used in reading the servo information. A preamplifier (not shown) sets a clock frequency and an amplifying gain to read the servo information according to the frequency and the amplitude of the servo synchronization signal. The SIM is used to mark the first servo sector among sectors written in a track and the SAM is used to notify a start position of a servo sector. The gray code is used to notify a track address and is set to contribute to increase a writing capacity by minimizing changes in bits between adjacent tracks. For instance, there is only 1 bit difference between gray codes of adjacent tracks. Generally, bursts are used to determine a degree of deviation of the head from a centerline of a track and there are 4 kinds of bursts generally.

FIG. 3 shows a flowchart of a conventional write control method that controls whether to write data on a data sector successive to a target servo sector. Referring to FIG. 3, when a write command is issued, in operation s302 a write retry counter write_retry_cnt is initialized to 0.

In operation s304, it is checked whether an error is generated.

When an error is generated as indicated in operation s304, in operation s306 it is checked if the error is FGRAY (Fault of GRAY), which is an error impossible to correct by an error correction code and related to a gray code.

If the error is not the FGRAY, a write operation of data to a data sector successive to the servo sector (i.e., following the servo sector in an uninterrupted sequence) is allowed.

Otherwise in operation s310 it is checked that the write retry counter write_retry_cnt is less than or equal to a maximum write count max_write_rty_cnt after increasing the write retry counter write_retry_cnt by one in operation s308. If the write retry counter write_retry_cnt is less than or equal to the maximum write count max_write_rty_cnt, in operation s314 a write retry is performed and the process returns to the operation s304. Then, in operation s304, it is checked again whether the FGRAY was generated.

When, it is determined in operation s310 that the write retry counter write_retry_cnt is greater than a maximum write count max_write_rty_cnt that is, the FGRAY cannot be corrected. In operation s312, the target data sector is reassigned, that is, the target data sector is replaced with a spare data sector and data is written to a replaced spare data sector.

In the conventional write control method shown in FIG. 3, if a gray code of the target servo sector is damaged due to a scratch, a TA, etc., the FGRAY can not be corrected, however, the write retry may be repeated. Accordingly, data sectors between a servo sector that has a gray code damaged due to a scratch, a TA, etc., and a successive servo sector are defect-processed. As a result of the defect process, a writing capacity of the disc is reduced by an amount of the defect-processed data sectors, and the spare capacity of the disc is reduced as well.

BRIEF SUMMARY

According to an aspect of the present invention, there is provided a method of determining a size of an error generated in a servo sector of a HDD.

According to another aspect of the present invention, there is provided a write control method that controls whether to write data to a data sector successive to a servo sector according to a size of an error generated in the servo sector of a HDD.

According to still another aspect of the present invention, there is provided a HDD using the write control method.

According to still another aspect of the present invention, there is provided a computer-readable medium storing a program for executing the method of determining the size of an error.

According to still another aspect of the present invention, there is provided a computer-readable medium storing a program for executing the write control method.

According to an aspect of the present invention, there is provided a method of determining a size of an error generated in a servo sector of a HDD, the method including: reading servo information from the servo sector in which the error was generated; and determining a size of the error by the number of corresponding bits that differ from each other between the read servo information and normal servo information.

According to another aspect of the present invention, there is provided a write control method for a HDD, the method including: determining a size of an error when a gray code-related error is generated in a target servo sector; allowing data to be written to a data sector successive to the target servo sector when the size of the error is small enough to affect only the target servo sector; and prohibiting data from being written to the data sector successive to the target servo sector when the size of the error is large enough to affect the data sector successive to the target servo sector.

The write control method may also include: performing a retry operation iteratively to correct the error when the gray code-related error is generated; and performing the determining when an iteration number of the retry operation exceeds a number by which it is possible to determine that the error is generated due to a thermal asperity or a scratch.

The write control method may also include: comparing a track address obtained by converting the gray code read from the target servo sector into a target track address; and allowing data to be written to the data sector when a difference between the converted track address and the target track address is greater than a predetermined threshold value.

According to still another aspect of the present invention, there is provided a HDD including: a disc storing information; a spindle motor rotating the disc; a head writing information on the disc and for reading information from the disc; a VCM driver driving a VCM to move the head over the disc; and a controller controlling the VCM drive so that the head writes data. The controller controls a write operation by determining a size of an error when a gray code-related error is generated in a target servo sector, allowing data to be written to a data sector successive to the target servo sector when the size of the error is small enough to affect the target servo sector only and prohibiting data from being written to the data sector successive to the target servo sector when the size of the error is large enough to affect the data sector successive to the target servo sector.

According to still another aspect of the present invention, there is provided a computer-readable recording medium storing a program for executing a method of determining a size of an error generated in a gray code marking a track address of HDD, the method including: reading a gray code of a target servo sector; converting a target track address into a gray code; and determining a size of an error as the number of corresponding bits, which are different from each other between the gray codes, read from the servo sector and the gray code obtained by converting the target track address.

According to still another aspect of the present invention, there is provided a computer-readable recording medium storing a program for executing a write control method of controlling whether to write data to a data sector successive to a target servo sector of a HDD, the method including: determining a size of an error when a gray code-related error is generated in the target servo sector; allowing data to be written to a data sector successive to the target servo sector when the size of the error is small enough to affect the target servo sector only; and prohibiting data from being written to the data sector successive to the target servo sector when the size of the error is large enough to affect the data sector successive to the target servo sector.

According to yet another aspect of the present invention, there is provided a computer-readable recording medium storing a program for executing a method of determining a size of an error generated in a servo sector of a hard disc drive (HDD), the method including: reading servo information from the servo sector in which the error was generated; and determining a size of the error by the number of corresponding bits that differ from each other between the read servo information and normal servo information.

Additional and/or other aspects and advantages of the present invention will be set forth in part in the description which follows and, in part, will be obvious from the description, or may be learned by practice of the invention.

BRIEF DESCRIPTION OF THE DRAWINGS

Additional and/or other aspects and advantages of the present invention will be set forth in part in the description which follows and, in part, will be obvious from the description, or may be learned by practice of the invention.

DETAILED DESCRIPTION OF EMBODIMENTS

Figure 1:
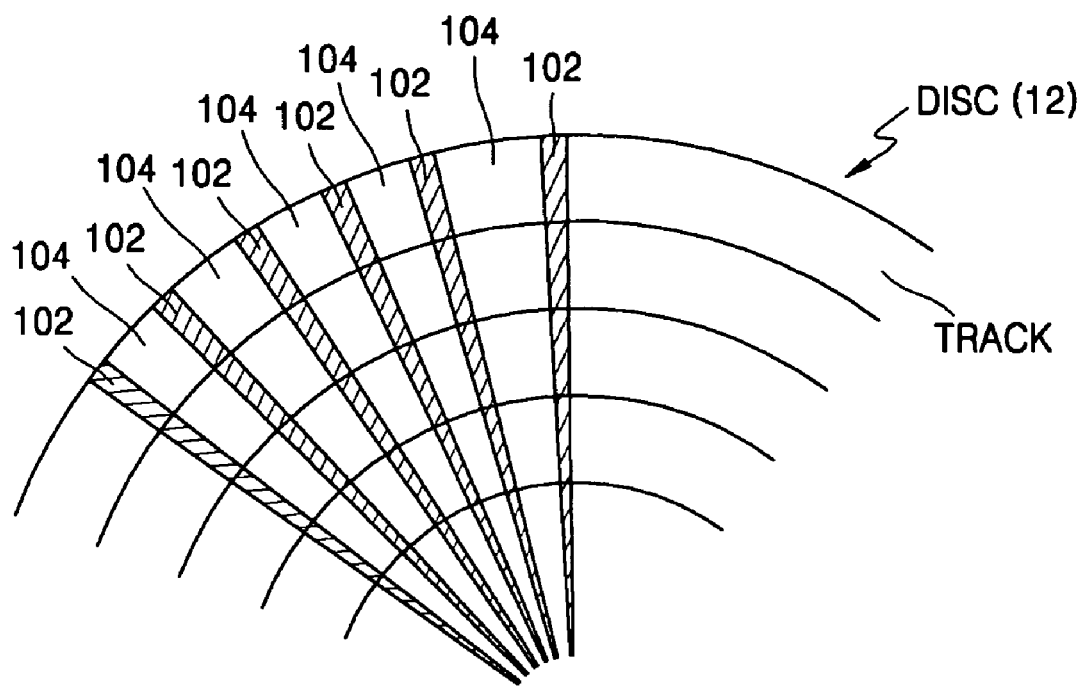
FIG. 1 shows servo sectors written on a disc.
Figure 2:
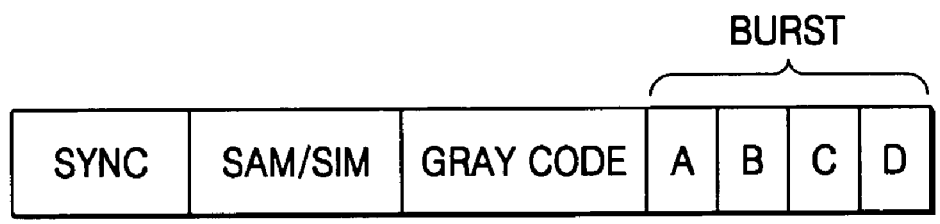
FIG. 2 shows a format of servo information written in a servo sector.
Figure 3:
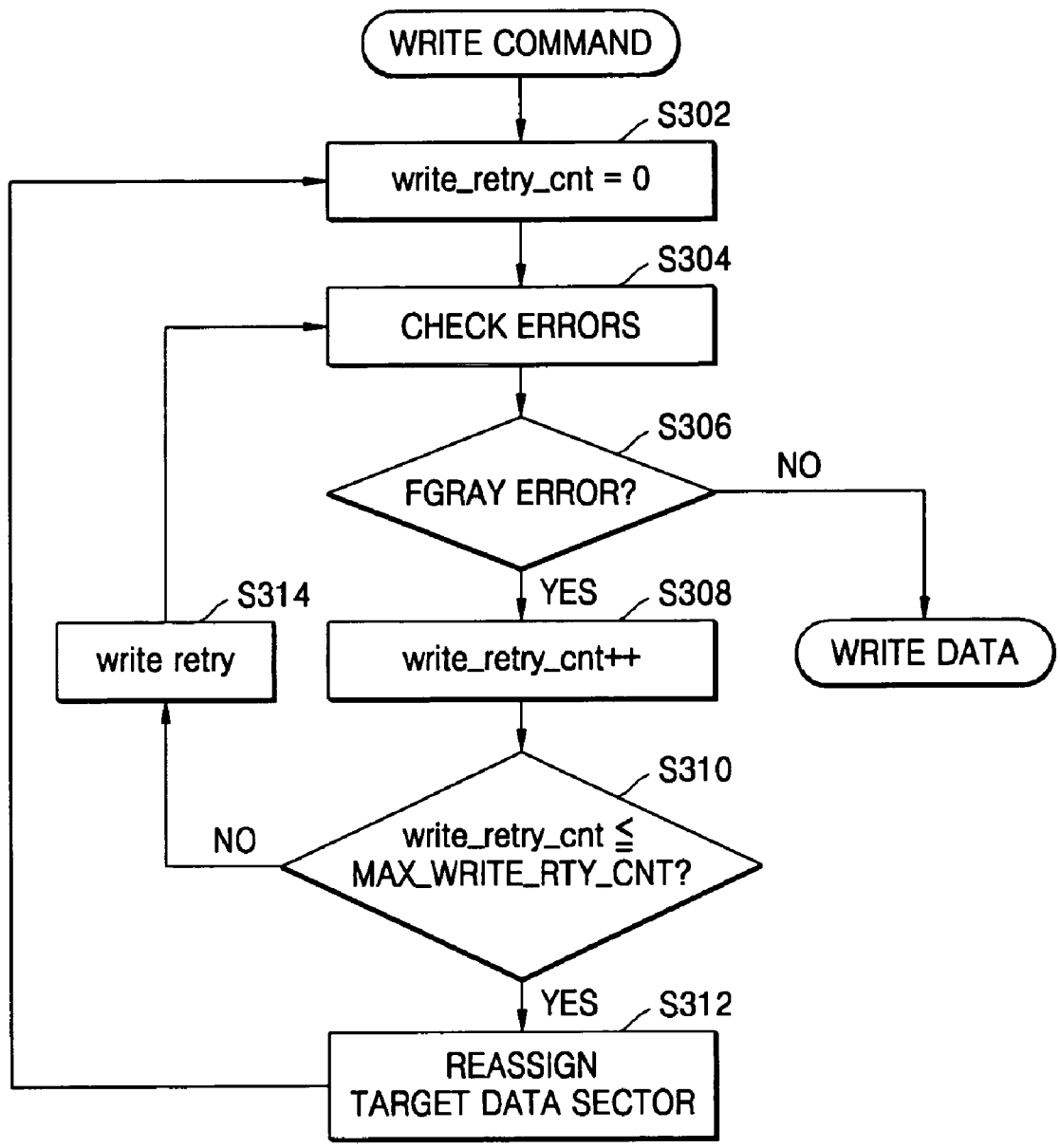
FIG. 3 shows a flowchart of a conventional write control method of controlling whether to write data in a data sector successive to a target servo sector.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 4:
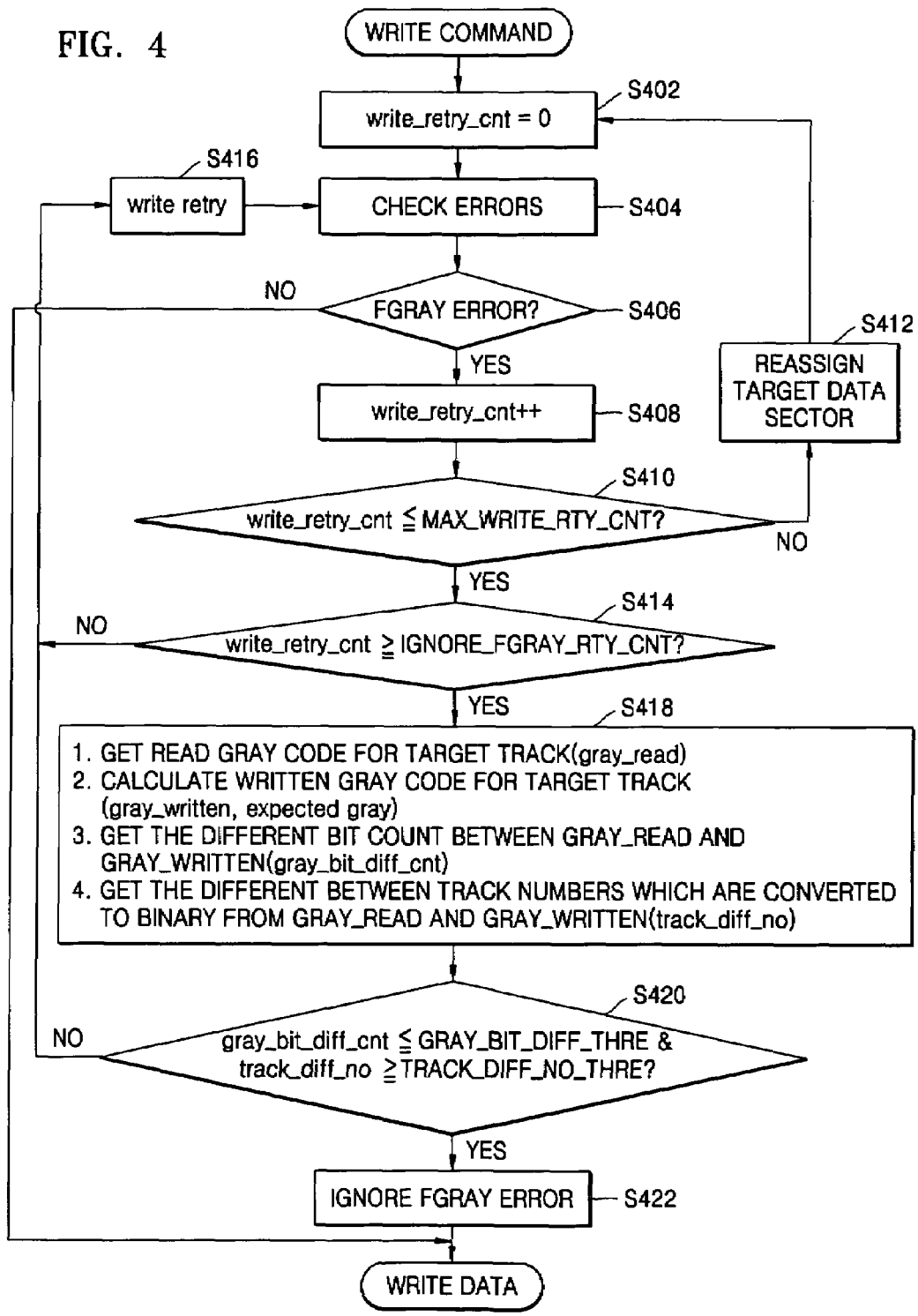
FIG. 4 illustrates a flowchart of a write control method according to an embodiment of the present invention.

FIG. 4 illustrates a flowchart of a write control method according to an embodiment of the present invention. Referring to FIG. 4, in operation s402 a write retry counter write_retry_cnt is initialized to 0 when a write command is issued.

In operation s404, it is checked if an error is generated. A servo device (not shown) checks whether a head follows a target track correctly, whether a gray code is detected normally, etc. The servo device determines whether a track address obtained by a gray code read from a servo sector is identical to a track address of the target track. When these track addresses are identical, it is possible to determine that the head follows the target track correctly.

Meanwhile, even if the head follows the target track correctly by referring to other servo information from other servo sectors, if it is not possible to read a normal gray code from a target servo sector, it is possible to determine that an error is generated in the gray code of the target servo sector. That is, it is possible to determine that the gray code of the target servo sector is damaged by a certain cause.

In operation s406, it is checked if the error is FGRAY. The servo device determines if the FGRY is generated in the target servo sector when a normal gray code is not detected from the target servo sector.

When the error is the FGRAY, in operation s408 the write retry counter write_retry_cnt is increased by 1, in operation s410, it is checked if a value of the write retry counter write_retry_cnt is less than or equal to a maximum write retry count.

When the write retry counter write_retry_cnt is greater than the maximum write retry count, in operation s412, the target data sector is reassigned, thereby data is written in a replaced spare data sector. The method then returns to operation 402.

When the write retry counter write_retry_cnt is less than or equal to a maximum write count max_write_rty_cnt in operation s410, in operation s414 it is checked if a value of the write retry counter write_retry_cnt is less than or equal to a retry count IGNORE_FGRAY_RTY_CNT, by which it is possible to determine that the error is caused by a damage of the gray code.

When the value of the write retry counter write_retry_cnt is less than or equal to the retry count IGNORE_FGRAY_RTY_CNT, in operation s416, a write retry is performed and the process returns to operation s404.

In write retry operation s416, various measures provided for error-correction are performed one by one every time when the target servo sector is relocated during a rotation of the disc. For example, a clock frequency, an amplifying gain, etc., are adjusted during a rotation of the disc and the gray code is read again when the target servo sector is relocated. In operation s404, it is checked again whether the FGRAY is generated is checked over.

It is known that servo information is written on the disc by a servo writer or a self-servo writing process when manufacturing the HDD. In addition, defected servo sectors are processed through a servo defect detecting process after servo information was written. Accordingly, if the FGRAY is generated in user environment, it can be considered that a gray code is damaged due to a TA, a scratch, etc., after the HDD was sold.

When the value of the write retry counter write_retry_cnt is greater than the retry count IGNORE_FGRAY_RTY_CNT, it is determined that the error is caused due to a TA or a scratch.

If a gray code is damaged due to a TA or a scratch, the FGRAY is generated repeatedly although a write retry is iterated because it is impossible to read a correct gray code. Accordingly, if the FGRAY is generated repeatedly although a write retry is iterated as many times as the retry count IGNORE_FGRAY_RTY_CNT, by which it is possible to determine that the error is caused by a damage of a gray code, it is possible to determine whether the gray code is damaged due to a TA or a scratch.

When an error is generated at a gray code of the target servo sector simply, it is possible to write data to a data sector successive to the target servo sector.

However it is not proper to write data to a data sector successive to the target servo sector unconditionally even though it is determined that the gray code of the target servo sector is damaged due to a TA or a scratch. This is because it is impossible to reproduce written data from the data sector when the damage is not small enough to be limited to the gray code but big enough to affect still the data sector successive to the damaged target servo sector.

Thus, data should be written after identifying that the error, a gray code related error due to a TA or a scratch, is small enough to affect the target servo sector only.

Whether the error of the gray code is small enough to affect to the target servo sector only is determined by comparing a size of the error with a predetermined threshold value.

In operation s418, the size of the error generated in the gray code that is, a degree of damage due to a TA or a scratch, is determined by using a method of determining a size of an error according to an embodiment of the present invention.

A method to determine the degree of damage on the gray code due to a TA or a scratch, includes:

1) reading a gray code from the target servo sector;
2) converting a track address of the target track into a gray code. If the head follows the target track correctly and a gray code of the target servo sector is not damaged, the gray code read from the target servo sector is identical to the gray code obtained by converting the target track address into; and
3) calculating the number of bits that are different from each other by comparing every corresponding bits between the gray code read from the target servo sector and the gray code obtained by converting the target track address.

If the head follows the target track correctly and a gray code of the target servo sector is not damaged, the gray code read from the target servo sector is identical to the gray code obtained by converting the target track address into and the number of bits different from each other is identical to 0. However, even though the servo device follows the target track correctly, the gray code read from the target servo sector is not identical to the gray code obtained by converting the target track address into and the number of bits different from each other is not identical to 0 if a gray code of the target servo sector is damaged. In addition, the number of bits different from each other is indicative of a size of the error generated at the gray code.

4) When the number of bits different from each other is less than a predetermined threshold value, to write data to a data sector successive to the target servo sector is allowed because it is possible to determine that the size of the damage is small enough to affect the target servo sector only.

Although the above method explains how to determine the size of the error generated at the gray code of the target servo sector in operation s418, the same method is applicable to every kind of sector information, which has substantially a constant value.

However, although the size of the error due to a TA or a scratch is small enough to affect a servo sector only, there remains some degree of possibility of danger to allow data to be written to a data sector with this condition only.

When the head moves, the head can move radially across the tracks due to vibrations, disturbances, etc., between two servo sectors, that is, during 1 servo sample period. In this case, the FGRAY is generated and, however, the number of different bits is extremely small. In other words, in this case, it is possible to determine that the size of the error generated due to a TA or a scratch is small enough to affect a servo sector only. Thus, when writing of data to a data sector successive to the servo sector is allowed, data on adjacent tracks can be erased.

Thus, according to an embodiment of the present invention, operations below are added in operation s420 to prevent an undesirable situation due to a movement of the head caused by vibrations, disturbances, etc., 1) comparing a track address obtained by converting the gray code read from the target servo sector with the target track address.

2) allowing data to be written if a difference between the track address converted from the gray code and the target track address is greater then a predetermined threshold track_diff_ther.

Here, the predetermined threshold track_diff_ther is set by considering influences of vibrations, disturbances, etc., and it denotes a maximum number of tracks across which the head can move between two servo sectors.

In other words, this condition is used in order to prevent an undesirable situation when the head follows a track due to vibrations, disturbances, etc.

When the difference between the track address converted from the gray code and the target track address is greater than the maximum number of tracks over which the head can move between two servo sectors in operation s420, it is allowed to write data to a data sector successive to the target servo sector.

Otherwise i.e., when the difference between the track address converted from the gray code and the target track address is not greater than the maximum number of tracks over which the head can move between two servo sectors in operation s420, the write retry operation s416 is performed and the process returns to operation s404.

Thus, in the write control method according to the embodiment of the present invention, there is allowed to write data to the data sector as long as following conditions are fulfilled:

1) The FGRAY is repeated in many times;
2) The number of different bits between the gray code read from the disk and the gray code converted from the target track address is less than a predetermined threshold value; and
3) The difference between the track address converted from the gray code and the target track address is greater than the maximum number of tracks over which the head can move between two servo sectors.

Figure 5:
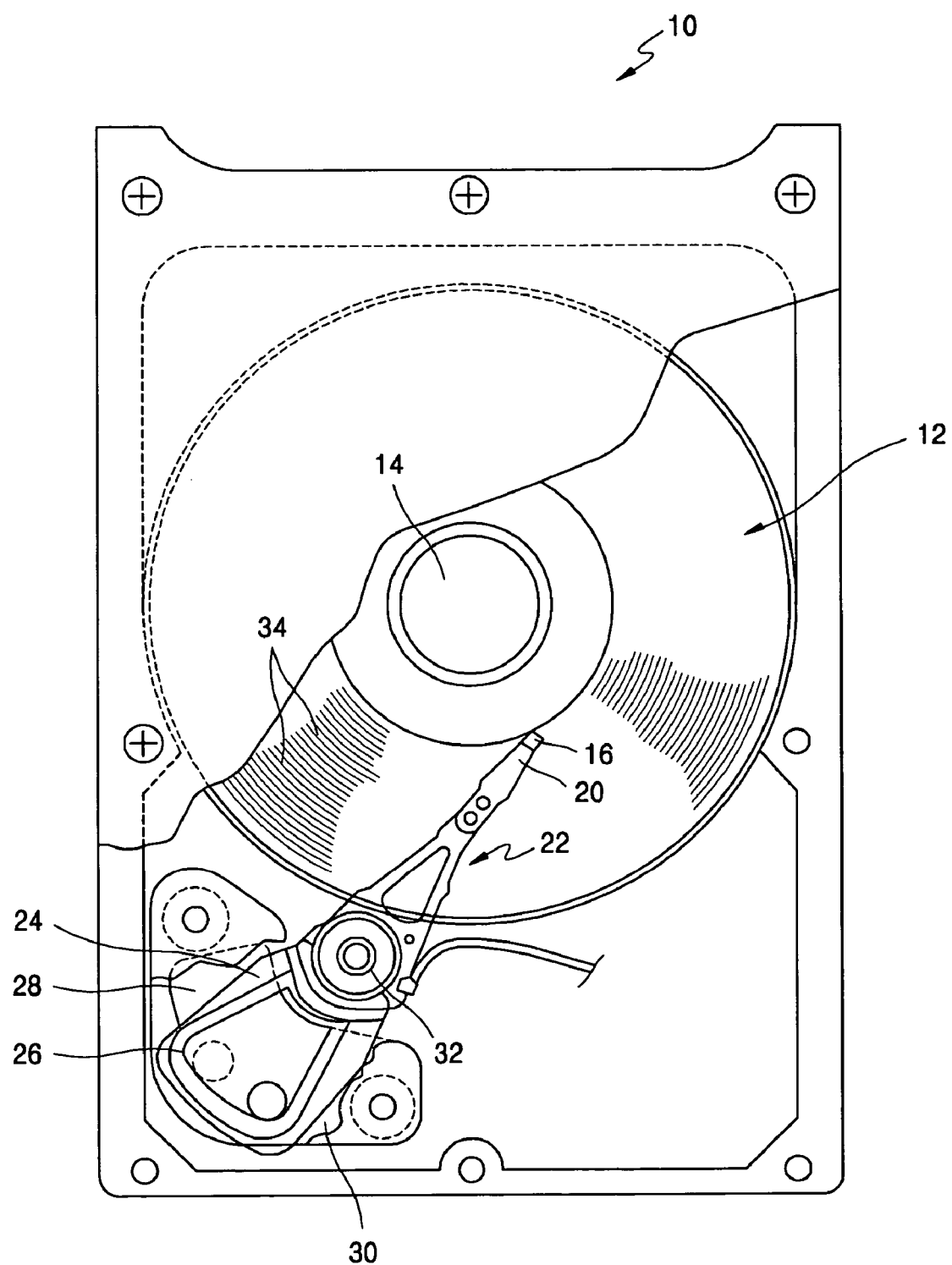
FIG. 5 is a schematic plan view of a head disc assembly (HDA) of an HDD to which an embodiment of the present invention is applied.

If the value of the write retry counter write_retry_cnt is greater than the maximum write retry count in operation s410, in operation s410, the data sector successive to the target servo sector is reassigned and data is written to a replaced spare data sector FIG. 5 is a schematic plan view of a head disc assembly (HDA) 10 of an HDD to which an embodiment of the present invention is applied.

Referring to FIG. 5, the HDA 10 includes at least one disc 12 rotated by a spindle motor 14. The HDA 10 also includes a transducer (not shown) adjacently located to a disc surface.

The transducer can read or write information from or on the rotating disc 12 by sensing a magnetic field formed on the disc 12 or magnetizing the disc 12. Typically, the transducer is combined with each disc surface. Though a single transducer is shown in FIG. 5, the transducer includes a write transducer, which magnetizes the disc 12, and a read transducer, which senses a magnetic field of the disc 12. The read transducer is composed of an MR component.

The transducer can be combined with a head 16. The head 16 generates an air bearing between the transducer and the disc surface. The head 16 is combined with a head stack assembly (HSA) 22 via a slider 20. The HSA 22 is attached to an actuator arm 24 having a voice coil 26. The voice coil 26 is located adjacent to a magnetic assembly 28 specifying (supporting) a voice coil motor (VCM) 30. A current supplied to the voice coil 26 generates a torque, which rotates the actuator arm 24 around a bearing assembly 32. The rotation of the actuator arm 24 moves the transducer across the disc surface.

Information is stored in concentric tracks of the disc 12. In general, each track 34 includes a plurality of sectors. Each sector includes a servo area and a data field.

Figure 6:
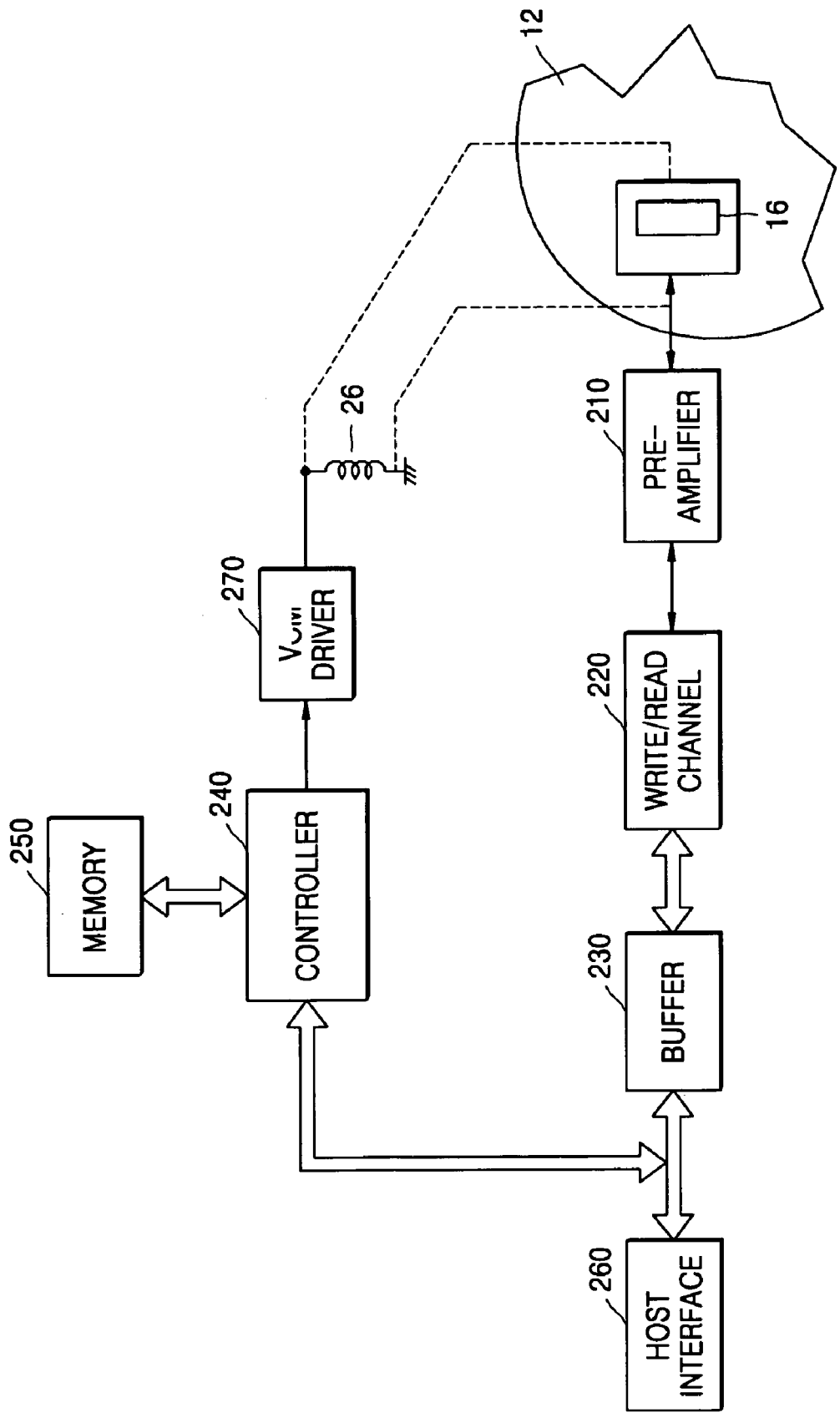
FIG. 6 is an electrical circuit configuration of the HDD to which an embodiment of the present invention is applied.

FIG. 6 is an electrical circuit configuration of a HDD to which an embodiment of the present invention is applied.

Referring to FIG. 6, the HDD includes a disc 12, a transducer including head 16, a pre-amplifier 210, a write/read channel 220, a buffer 230, a controller 240, a memory 250, a host interface 260, and a VCM driver 270.

A circuit including the pre-amplifier 210 and the write/read channel 220 is called a write/read circuit.

In the memory 250, firmware controlling the HDD, specification information of servo address/index signal of a reference servo pattern, and specification information of servo address/index signal of a final servo pattern are stored. Here, the memory 250 is designed with a flash memory, which is a non-volatile memory.

Especially, the memory 250 stores a program to control whether to write data to a data sector successive to a target servo sector according to a size of an error when a gray code-related error is generated in the target servo sector.

In a data read mode, the HDD amplifies an electrical signal sensed by the transducer 16 (called the head) using the pre-amplifier 210 for the convenience of signal processing. The HDD encodes the amplified analog signal into a digital signal that can be read by a host device (not shown) using the write/read channel 220, converts the digital signal to stream data, temporarily stores the stream data in the buffer 230, and transmits the stream data to the host device via the host interface 260.

In a data write mode, the HDD receives data from the host device via the host interface 260, temporarily stores the received data in the buffer 230, sequentially outputs the data stored in the buffer 230, converts the sequentially output data to a binary data stream suitable for a write channel using the write/read channel 220, and writes a write current amplified by the pre-amplifier 210 on the disc 12 using the transducer including head 16.

The controller 240 analyzes a command received from the host device through the host interface 260 and controls the apparatus shown in FIG. 6 corresponding to the analyzed results. If a data write command is received from the host device, the controller 240 writes data to data sectors between servo sectors while controlling the head to follow a target track by referring to servo information written in servo sectors.

Hereinafter, a write control method according to an embodiment of the present invention will be described in detail with concurrent reference to FIGS. 5 and 6.

The controller 240 checks whether the FGRAY is generated during a write operation. The controller 240 reads a gray code of the target servo sector by the transducer including head 16 and checks whether the FGRAY is generated by comparing the read gray code and a gray code in a normal following situation, that is, a gray code obtained by converting the target track address.

When the FGRAY was generated, the controller 240 performs a write retry as many times as a retry count IGNORE_FGRAY_RTY_CNT by which it is possible to determine the FGRAY is caused by a damage of the gray code.

If it is impossible to correct the FGRAY by write retry performed as many times as the retry count IGNORE_F-GRAY_RTY_CNT, it is possible to determine that the FGRAY was generated due to a TA or a scratch, and thus the controller 240 determines a size of the error.

In detail, the controller 240 reads the gray code from the target servo sector and compares it with a gray code corresponding to the target track address to count the number of bits gray_bit_diff_cnt, which differ from each other between the gray codes.

If the number of bits different from each other is less than a predetermined threshold value GRAY_BIT_DIFF_THRE, the controller 240 determines that the size of the damage is small enough to affect the target servo sector only and allows data to be written to a data sector successive to the target servo sector. Otherwise, the controller 240 defect-processes data sectors successive to the target servo sector and writes data to replaced spare data sectors.

In addition, if the number of different bits is less then a predetermined threshold value GRAY_BIT_DIFF_THRE, the controller 240 checks whether the difference between a track address converted from the gray code and the target track address is greater than the maximum number of tracks over which the head can move between two servo sectors.

If the difference between the track address converted from the gray code and the target track address is greater than the maximum number of tracks over which the head can move between two servo sectors, the controller 240 allows data to be written to the data sector successive to the target servo sector finally.

Thus, the HDD according to the embodiment of the present invention allows the write operation of data to the data sector as long as these following conditions are fulfilled:
1) The FGRAY is repeated in many times;
2) The number of different bits between the gray code read from the disk and the gray code converted from the target track address is less than a predetermined threshold value GRAY_BIT_DIFF_THRE; and
3) The difference between the track address converted from the gray code and the target track address is greater than the maximum number of tracks over which the head can move between two servo sectors.

Embodiments of the present invention can be realized as a method, an apparatus, and/or a system. When an embodiment of the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium is any data storage device that can store or transmit data, which can be thereafter read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, and RF networks.

The write control method according to the above-described embodiments of the present invention can maintain the writing capacity of a HDD by allowing a write operation of data to a data sector successive to a servo sector as long as the size of an error generated in the servo sector is small enough to affect to the servo sector only.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of determining a size of an error generated in a servo sector of a hard disc drive (HDD), the method comprising:
reading servo information from the servo sector in which the error was generated, the servo information being a gray code marking a track address;
determining the number of corresponding bits that differ from each other between the read servo information and normal servo information, the size of the error being based on the number of corresponding bits that differ from each other between the read servo information and normal servo information;
performing a retry operation iteratively to correct the error when the gray code-related error is generated; and
getting the determining performed when an iteration number of the retry operation exceeds a number by which it is possible to determine that the error is generated due to a thermal asperity or a scratch.

2. A method of determining a size of an error generated in a gray code to notify a track address of a hard disc drive (HDD), the method comprising:
reading the gray code of a target servo sector;
converting an address of a target track into a gray code;
determining the number of corresponding bits that differ from each other between the read gray code and the gray code obtained by converting the target track address, the size of the error being based on the number of corresponding bits that differ from each other between the read gray code and the gray code obtained by converting the target track address;
performing a retry operation iteratively to correct the error when the gray code-related error is generated; and
getting the determining performed when an iteration number of the retry operation exceeds a number by which it is possible to determine that the error is generated due to a thermal asperity or a scratch.

3. A write control method for a hard disc drive (HDD), comprising: determining a size of an error when a gray code-related error is generated in a target servo sector, the size of the error being based on the number of corresponding bits that differ from each other between read servo information from said target servo sector and normal servo information; allowing data to be written to a data sector successive to the target servo sector when the size of the error is less than a predetermined threshold to affect only the target servo sector; and prohibiting data from being written to the data sector successive to the target servo sector when the size of the error is greater than a predetermined threshold value to affect the data sector successive to the target servo sector.

4. The method of claim 3, further comprising:
comparing a track address obtained by converting the gray code read from the target servo sector with a target track address; and
allowing data to be written to the data sector when a difference between the converted track address and the target track address is greater than a predetermined threshold value.

5. The method of claim 4, wherein the threshold value is a maximum number of tracks over which a head moves when moving between two servo sectors.

6. A hard disc drive (HDD) comprising: a disc storing information; a spindle motor rotating the disc; a head writing information on the disc and for reading information from the disc; a VCM driver driving a VCM to move the head over the disc; and a controller controlling the VCM driver so that the head writes data, wherein the controller controls a write operation by determining a size of an error when a gray code-related error is generated in a target servo sector, the size of the error being based on the number of corresponding bits that differ from each other between read servo information from said target servo sector and normal servo information, allowing data to be written to a data sector successive to the target servo sector when the size of the error is less than a predetermined threshold value to affect the target servo sector only and prohibiting data from being written to the data sector successive to the target servo sector when the size of the error is greater than a predetermined threshold value to affect the data sector successive to the target servo sector.

7. The HDD of claim 6, wherein the controller controls whether to write data to the data sector by converting the gray code read from the target servo sector into a track address, comparing the converted track address with the target track address and allowing data to be written to the data sector when a difference between the converted track address and the target track address is greater than a predetermined threshold value when the size of the error is small enough to affect to the target servo sector only.

8. A computer-readable recording medium storing a program for executing a method of determining a size of an error generated in a gray code marking a track address of a hard disk drive (HDD), the method comprising:
reading a gray code of a target servo sector;
converting a target track address into a gray code;
determining the number of corresponding bits, which differ from each other between the gray codes, read from the servo sector and the gray code obtained by converting the target track address, the size of the error being based on the number of corresponding bits that differ from each other between the read gray code and the gray code obtained by converting the target track address;
performing a retry operation iteratively to correct the error when the pray code-related error is generated; and
getting the determining performed when an iteration number of the retry operation exceeds a number by which it is possible to determine that the error is generated due to a thermal asperity or a scratch.

9. A computer-readable recording medium storing a program for executing a write control method of controlling whether to write data to a data sector successive to a target servo sector of a hard disc drive (HDD), the method comprising:
determining a size of an error when a gray code-related error is generated in the target servo sector according to the method of claim 8;
allowing data to be written to a data sector successive to the target servo sector when the size of the error is less than a predetermined threshold value to affect the target servo sector only; and
prohibiting data to be written to the data sector successive to the target servo sector when the size of the error is greater than a predetermined threshold value to affect the data sector successive to the target servo sector.

10. The computer-readable recording medium of claim 9, wherein the method further comprises:
performing a retry operation iteratively to correct the error when the gray code-related error is generated; and
performing the determining when an iteration number of the retry operation exceeds a number by which it is possible to determine that the error is generated due to a thermal asperity or a scratch.

11. The computer-readable recording medium of claim 9, the method further comprising:
comparing a track address obtained by converting the gray code read from the target servo sector with a target track address; and
allowing data to be written to the data sector when a difference between the converted track address and the target track address is larger than a predetermined threshold value.

12. A computer-readable recording medium storing a program for executing a method of determining a size of an error generated in a servo sector of a hard disc drive (HDD), the method comprising:
reading servo information from the servo sector in which the error was generated, the servo information being a gray code marking a track address;
determining the number of corresponding bits that differ from each other between the read servo information and normal servo information, the size of the error being based on the number of corresponding bits that differ from each other between the read servo information and normal servo information;
performing a retry operation iteratively to correct the error when the pray code-related error is generated; and
getting the determining performed when an iteration number of the retry operation exceeds a number by which it is possible to determine that the error is generated due to a thermal asperity or a scratch.

* * * * *

UNITED STATES PATENT AND TRADEMARK OFFICE
CERTIFICATE OF CORRECTION

PATENT NO. : 7,715,140 B2
APPLICATION NO. : 11/442239
DATED : May 11, 2010
INVENTOR(S) : Sang-hoon Chu et al.

It is certified that error appears in the above-identified patent and that said Letters Patent is hereby corrected as shown below:

Column 11, Line 53, change "pray" to --gray--.

Column 12, Line 50, change "pray" to --gray--.

Signed and Sealed this

Seventeenth Day of August, 2010

David J. Kappos
*Director of the United States Patent and Trademark Office*